United States Patent
De Cristoforo et al.

(10) Patent No.: US 8,145,405 B2
(45) Date of Patent: Mar. 27, 2012

(54) INTERNAL-COMBUSTION ENGINE WITH VARIABLE ACTUATION OF THE INTAKE VALVES AND SELF-ADAPTIVE CONTROL OF THE AIR-FUEL RATIO WITH SUPERVISION OF THE CONTROL FUNCTIONS

(75) Inventors: Ferdinando De Cristoforo, Turin (IT); Fabio Garofalo, Turin (IT); Eduardo Sepe, Turin (IT); Domenico Tavella, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 241 days.

(21) Appl. No.: 12/624,992

(22) Filed: Nov. 24, 2009

(65) Prior Publication Data
US 2010/0168987 A1 Jul. 1, 2010

(30) Foreign Application Priority Data
Dec. 29, 2008 (EP) .................................. 08425819

(51) Int. Cl.
*F02D 41/26* (2006.01)
(52) U.S. Cl. .................. 701/102; 123/90.11; 123/90.12; 123/90.15
(58) Field of Classification Search .................. 701/103, 701/105, 102; 123/90.11, 90.12, 90.15, 90.16, 123/90.17
See application file for complete search history.

(56) References Cited

U.S. PATENT DOCUMENTS

| | | | | |
|---|---|---|---|---|
| 4,765,288 A | * | 8/1988 | Linder et al. ............... | 123/90.16 |
| 4,889,084 A | * | 12/1989 | Rembold .................... | 123/90.12 |
| 4,982,706 A | * | 1/1991 | Rembold .................... | 123/90.12 |
| 5,113,812 A | * | 5/1992 | Rembold et al. ........... | 123/90.12 |
| 6,718,945 B2 | * | 4/2004 | Doria et al. .................. | 123/432 |
| 6,728,626 B2 | * | 4/2004 | Maira et al. .................. | 701/114 |
| 6,732,710 B2 | * | 5/2004 | Borean et al. ................. | 123/432 |
| 6,736,092 B2 | * | 5/2004 | Borean et al. ............... | 123/90.12 |
| 6,745,122 B2 | * | 6/2004 | Burgdorf et al. .............. | 701/115 |
| 7,748,363 B2 | * | 7/2010 | Borean et al. ................. | 123/434 |
| 7,753,029 B2 | * | 7/2010 | Borean et al. ................. | 123/434 |
| 2005/0044934 A1 | | 3/2005 | Weiss et al. | |
| 2007/0125350 A1 | | 6/2007 | Morita et al. | |

OTHER PUBLICATIONS

European Search Report for EP Application No. 08 42 5819, dated Sep. 9, 2008.

* cited by examiner

*Primary Examiner* — Hai Huynh
(74) *Attorney, Agent, or Firm* — Nixon & Vanderhye P.C.

(57) ABSTRACT

An internal-combustion engine for motor vehicles, for example a petrol-fuelled engine or a gas-fuelled engine, is provided with an electronically controlled hydraulic system for variable actuation of the intake valves. The system of variable actuation of the intake valves is governed by an electronic control unit that is programmed for performing at least once, at the start of the life of the engine, an activity of supervision of the functions of self-adaptive control of the air-fuel ratio. The supervision activity is based upon identification of a constant ratio between a delta in the value of the crank angle used by the electronic control unit and the error in the estimation of the air-fuel ratio by the electronic control unit when the system of actuation of the intake valves operates in late-opening mode. The activity of supervision envisages that the electronic control unit detects and stores the variation in the value of the crank angle (crank-angle delta) that must be applied to the value of the crank angle used by the electronic control unit in order to reach an estimated value of the mass of air taken in that basically coincides with the real value.

8 Claims, 3 Drawing Sheets

INTERNAL-COMBUSTION ENGINE WITH VARIABLE ACTUATION OF THE INTAKE VALVES AND SELF-ADAPTIVE CONTROL OF THE AIR-FUEL RATIO WITH SUPERVISION OF THE CONTROL FUNCTIONS

This application claims priority to EP Application No. 08425819.3, filed 29 Dec. 2008, the entire contents of which is hereby incorporated by reference.

FIELD OF THE INVENTION

The present invention relates to internal-combustion engines and in particular, even though not exclusively, to controlled-ignition engines, for example petrol-fuelled or gas-fuelled engines, for motor vehicles. More specifically, the invention regards engines of the type comprising:

- at least one intake valve for each cylinder, provided with elastic means tending to a push the intake valve towards a closed position;
- at least one camshaft for controlling said intake valves, by means of respective tappets; and
- an electronically controlled hydraulic system for variable actuation of the intake valves, said system including:
   - a pressurized fluid chamber set between each tappet and a respective intake valve, said pressurized fluid chamber being designed to be connected to an exhaust channel with a passage controlled by a solenoid valve so that, when the solenoid valve is opened, the intake valve is uncoupled from the respective tappet and is kept closed by said elastic means; and
   - electronic control means for controlling each of said solenoid valves so as to vary the time and/or travel of opening of the respective intake valve as a function of one or more parameters representing the operating conditions of the engine, such as for example the engine r.p.m. and/or the temperature of the engine coolant and/or the temperature of the body of the engine.

PRIOR ART

A system of variable actuation of the intake valves of the engine of the type described above, identified with the trade marks UNIAIR or MULTIAIR, has been developed for some time by a company of the same group as the present applicant (see for example the documents Nos. EP-A-803 642, EP-A-0 961 870, EP-A-0 931 912, EP-A-0 939 205, EP-A-1 091 097, EP-A-1 245 799, EP-A-1 243 763, EP-A-1 243 762, EP-A-1 243 764, EP-A-1 243 761, EP-A-1 273 770, EP-A-1 321 634, EP-A-1 338 764, FP-A-1 344 900, EP-A-1 635 045, EP-A-1 635 046, EP-A-1 653 057, EP-A-1 674 673, EP-A-1 726 790).

Figure 1:
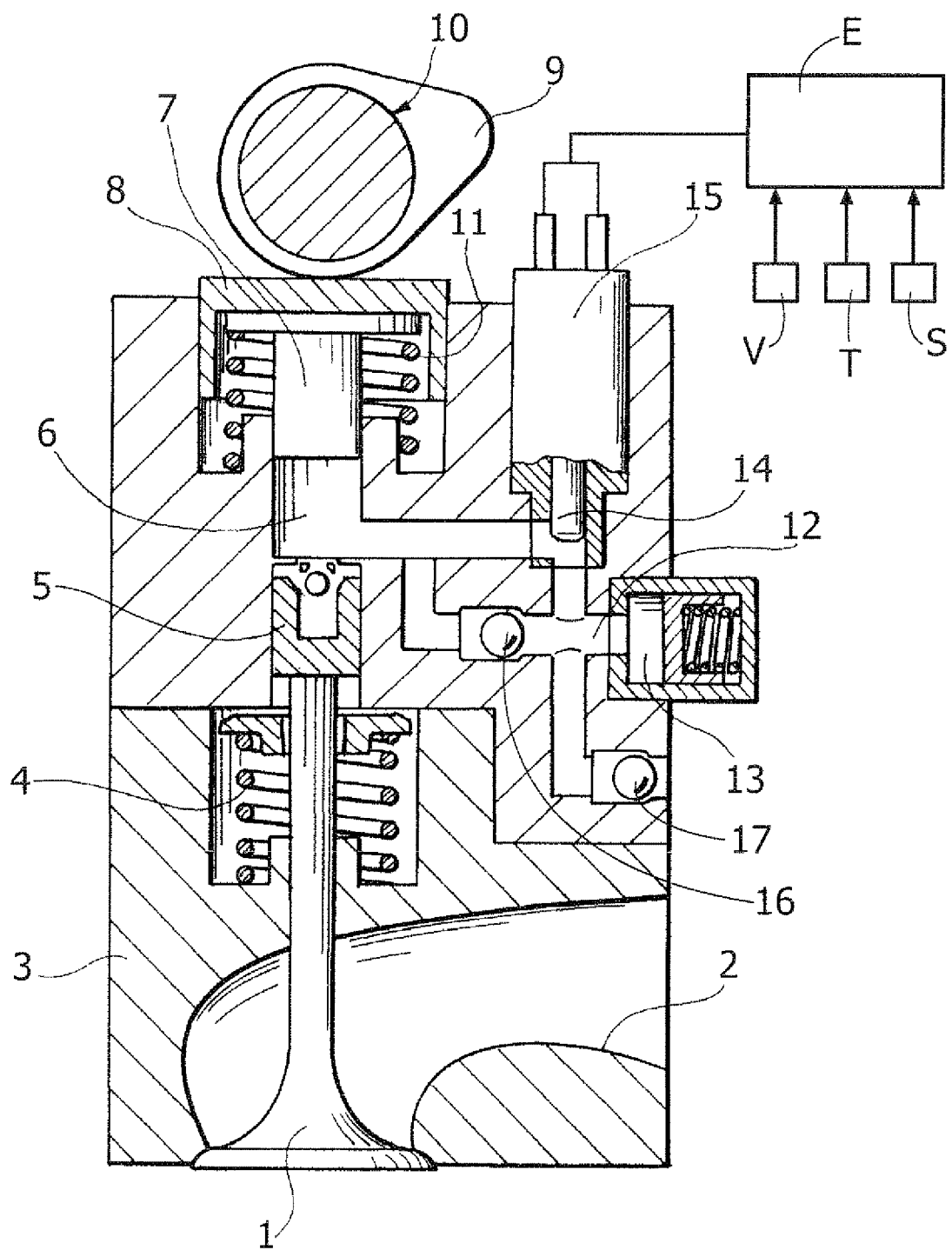

FIG. 1 of the annexed drawings is a schematic view, provided by way of example, of the system mentioned above for variable actuation of the intake valves. With reference to said figures, the number 1 designates as a whole an intake valve associated to a respective intake duct 2, formed in a cylinder head 3 of an internal-combustion engine, specifically a petrol-fuelled engine or gas-fuelled engine. The valve 1 is recalled towards its closed position (upwards as viewed in the figures) by a spring 4, whilst it is forced to open by a plunger 5 acting on the top end of the valve stem. The plunger 5 is in turn controlled by means of pressurized oil that is present in a pressurized chamber 6, on which there acts a pumping plunger 7 that moves together with a tappet 8 co-operating with a can 9 of a camshaft 10. The tappet 8 is pushed by a spring 11 and is in sliding contact with the cam 9. The pressure chamber 6 is designed to be connected to an exhaust duct 12, which in turn communicates with an accumulator of pressurized oil 13. Connection of the chamber 6 to the exhaust duct 12 is controlled by the open/close element 14 of a solenoid valve 15, which is in turn controlled by electronic control means, designated as a whole by E, as a function of the operating conditions of the engine. The electronic unit E can be a dedicated control unit or be integrated in the main electronic control unit of the motor vehicle. In the preferred embodiment of the aforesaid system, the solenoid valve 15 is of a normally open type. In said open condition, the chamber 6 is in communication with the exhaust passage 12 so that the cam 9 is deactivated, given that the movements of the tappet 8 and of the pumping plunger 7 do not cause corresponding movements of the plunger 5 for controlling the valve 1. The latter consequently remains in its closing position, in which it is kept by the spring 4. When the solenoid valve 15 is closed, the chamber 6 returns to being pressurized, filling with oil coming from the passage 12 (which communicates with the circuit for lubrication of the engine) and from the accumulator 13, through an auxiliary passage controlled by a non-return valve 16, as well as through the passage for communication with the lubrication circuit of the engine, controlled by the non-return valve 17. In said condition, the cam 9 is rendered active in so far as the movements of the tappet 8 and of the pumping plunger 7 are transmitted to the plunger 5, which governs movement of the valve 1. When the solenoid valve 15 is again brought into its open condition, the oil present in the chamber 6 is discharged, through the passage controlled by the solenoid valve 15, into the accumulator 13, so that the valve 1 closes rapidly as a result of the spring 4, the cam 9 thus being rendered inactive once again. The solenoid valve 15 is controlled by the electronic means E in the various operating conditions of the engine, according to any pre-set strategy so as to vary as desired both the instant of opening of the intake valve and the instant of closing of the intake valve, and consequently the travel of opening, so as to obtain ideal operation of the engine, for example from the point of view of the reduction of consumption or reduction of noxious exhaust gases in the various operating conditions.

Figure 2:
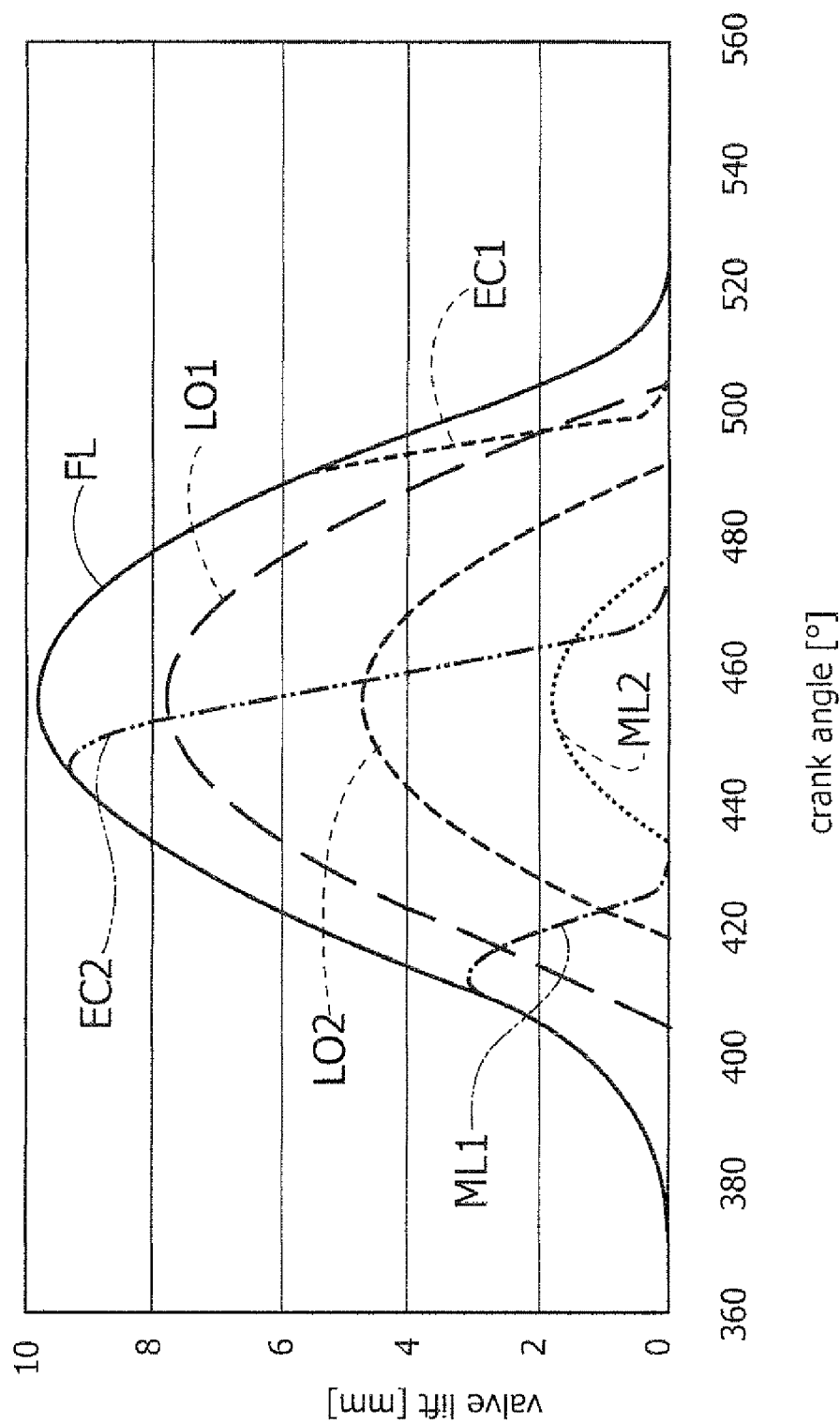

Thanks to the system described above, the diagram of the lift of the intake valve can assume various configurations according to what is exemplified in FIG. 2 of the annexed drawings, where the displacement of the intake valve is illustrated as a function of the angle of rotation of the camshaft. In said figure, the line FL (full lift) indicates a diagram of lift of a conventional type, which, with the system described above, is obtained by keeping the solenoid valve 15 constantly closed in such a way that the intake valve 1 displaces in the course of rotation of the crankshaft according to a law that depends upon the profile of the cam 9. Thanks to the system illustrated in FIG. 1, the solenoid valve 15 can be opened before completion of the conventional cycle so as to cause a rapid closing of the intake valve 1 according to an early-closing mode, exemplified in FIG. 2 by the line EC1 or by the line EC2.

Once again according to the known characteristics of the system illustrated in FIG. 1, the solenoid valve 15 can be left opened in the engine stroke where the cam 9 would start to cause opening of the intake valve 1. The solenoid valve 15 can hence be closed with a certain delay with respect to the value of the crank angle corresponding to the conventional opening of the intake valve, according to a late-opening mode exemplified, for instance, by the line LO1 or by the line LO2 in FIG. 2.

According to a further known possibility of the system illustrated in FIG. 1, the intake valve 1 can be actuated according to a multilift mode so as to open and close completely more than once within the conventional intake stroke. Said mode is exemplified in FIG. 2 with the lines ML1 and ML2, which show how the intake valve is actuated by opening it initially according to the conventional cycle and then closing it in advance (ML1), after which the valve is again opened and then closed in advance with respect to the instant of closing of the conventional cycle (ML2).

As already described above, the various strategies of activation of the intake valves are implemented with the system described above, by the electronic control unit E in the various operating conditions of the engine, as a function of one or more operating parameters indicating said operating conditions. For example (see FIG. 1), the unit E can be designed to receive signals at output from a sensor V for detecting the engine r.p.m. (FIG. 1) and from a sensor T for detecting the engine running temperature (which can be represented, for instance, by the temperature of the engine coolant, or by the temperature of the oil present within the high-pressure chamber of the hydraulic actuation system, or else also by the temperature of the metal body of the engine). In the case of conventional petrol-fuelled engines equipped with electronic injection, the control unit on board the motor vehicle is also prearranged for receiving the signal at output from the lambda probe, or UEGO (Universal Exhaust Gas Oxygen) probe that is associated to the exhaust duct of the engine and is able to issue a signal indicating the composition of the exhaust gases of the engine. Said signal is used by the system for controlling injection for a self-adaptive control of the air-fuel ratio with which the engine operates.

Modern petrol-fuelled engines for motor vehicles, particularly indirect-injection ones, require in fact a precise adjustment of the air-fuel ratio around the stoichiometric value to minimize the pollutant-gas emissions. In engines of a traditional type, the air-petrol ratio is self-adapted during the life of the vehicle in order to correct any possible dispersions of some components, amongst which the aforesaid UEGO probe or the petrol injectors.

In an engine, instead, of the type equipped with a system of variable actuation of the intake valves, as illustrated in FIG. 1, there exists the possibility of adapting the ratio by varying the mass of air taken in via an adjustment of the time and/or of the travel of opening of the intake valves. Said system may on the other hand be subject to the risk that the results obtained present a certain deviation with respect to the foreseen ones on account of dispersions of the hydraulic actuation system, in addition to possible imprecisions, within the production tolerances, in the setting angle of the camshaft.

In traditional engines without a system for variable actuation of the intake valves, there is envisaged in any case an adaptive adjustment of the air-petrol ratio via actuators of various types, for example by means of a motor-driven throttle valve, or else by means of adjustment of the setting angle of the camshaft, or else by means of supercharging. However, in said conventional solutions, it is not possible to discern between the causes of error depending upon the actuators/sensors that affect the mass of air taken in with respect to the ones that affect the amount of petrol injected (dispersion injectors, accuracy of measurement of the UEGO probe). Consequently, in said traditional systems, the approach is to act only upon a single variable (the injection of petrol) to compensate for the entire error measured on the ratio, irrespective of whether the cause of the error is in the system that controls the air or in the system that controls the petrol.

OBJECTS OF THE INVENTION

The applicant has, however, discovered that new potential is afforded by engines equipped with a system of variable actuation of the intake valves of the type that has been described above with reference to FIG. 1. In particular, the applicant has discovered two fundamental aspects.

A first important aspect that has been noted by the applicant lies in the fact that there exists a basically linear relationship between a variation in the value of the angle of rotation of the crankshaft taken into account by the system for controlling the intake valves (i.e., in particular, in the value of the angle of rotation of the crankshaft, where the intake valves are opened or closed by the control system) and the error resulting in the amount of air taken in and consequently in the air-petrol ratio.

A second important aspect that has been noted by the applicant is that the maximum sensitivity to the dispersions that have an impact upon the estimation of the amount of air taken in occurs in the so-called late-opening mode of operation (as in the case of the lines LO1, LO2 and ML2 of FIG. 2), where the intake valve is opened with a delay with respect to the value of the crank angle corresponding to the conventional opening. In addition, it has been noted that in said mode of operation the linear ratio between air error (i.e., the error in the estimation of the amount of air taken in) and crank-angle delta (i.e., the variation in the value of the crank angle that the valve-actuation system takes into account) is basically the same for any point of operation of the engine. More specifically, in the case of the system concretely produced by the applicant, there has been found a ratio between air error and crank-angle delta such that each degree of variation in the crank angle introduces an error of 10% in the estimation of the amount of air taken in.

By comparison, in the early-closing mode (lines EC1, EC1, ML1) the sensitivity to the variation in the angle is such that, for every 3 degrees of variation in the value of the crank angle of opening or closing of the intake valves, the angle of rotation of the crankshaft, where the intake valves are opened or closed by the control system, an error of approximately 10% on the value of the air taken in is produced.

The identification of the aforesaid aspects has constituted a first step towards the conception of the present invention, which has, as basic purpose, the production of an engine equipped with a system of variable actuation of the intake valves, in which it is possible to guarantee, in a relatively simple and efficient way, that the control system keeps the air-fuel ratio at its right value.

SUMMARY OF THE INVENTION

According to the present invention, said problem is solved by providing an engine having the characteristics that are specified in Claim 1.

In the engine according to the invention, the electronic unit E for controlling the system of variable actuation of the intake valves is prearranged for receiving the signal at output from means for detecting the air-fuel ratio, designated by S in FIG. 1, designed to detect and/or calculate the effective value of the ratio with which the engine is operating. Said sensing means S can be constituted by the UEGO probe already described above, which is conventionally associated to the exhaust duct of the engine and is exploited for self-adaptive control of the amount of petrol injected into engines with electronic petrol injection.

Once again according to the invention, the electronic control means of the system of variable actuation of the intake valves are programmed for performing at least once in the life of the engine, preferably upon first ignition of the engine after it comes off the production line, an activity of supervision of the functions of self-adaptive control of the air-fuel ratio that will enable elimination of the errors of estimation due to possible variations in the response of the valve-actuation system on account of the production tolerances. Said activity of supervision envisages, in the first place, activating, as soon as there exist the conditions therefor (as will be illustrated in detail in what follows), a mode of actuation, of the late-opening type, of the intake valves, where the intake valves are opened with a pre-set delay with respect to the value of the crank angle corresponding to start of the conventional engine stroke, determined by the geometry of the cam for actuation of the valve. Once said late-opening mode has been activated, the activity of supervision envisages detection of the error represented by the difference between the effective value of the air-fuel ratio, as detected by the aforesaid sensing means for detecting the ratio, and the theoretical value of the air-fuel ratio estimated by said electronic control means E. At this point, there is stored the variation in the value of the crank angle (crank-angle delta) that is to be applied to the value of the crank angle taken into account by the aforesaid electronic control means E so that the estimated value of the air-fuel ratio will coincide with the effective value. Said operation is possible thanks to the fact that, as discovered by the applicant, there exists a linear ratio between the crank-angle delta and the air error according to a constant that is maximum in the case of the late-opening mode. Once the aforesaid value of the crank-angle delta has been stored, said variation is applied from that point on throughout the life of the engine by the aforesaid electronic control means E so as to guarantee a zero, or basically zero, impact of the dispersions in the system due to the production tolerances on the precision of the control of the air-fuel ratio.

In the concrete implementation, since the late-opening mode cannot be immediately activated after first starting of the engine (there would be the risk of a failure in starting, as will be illustrated more clearly in what follows), the valve-actuation system is controlled adequately by the program of supervision to ensure support of the engine until the conditions of activation of the late-opening mode are produced. For this purpose, preferably the control system is activated initially in full-lift mode (line FL in FIG. 2). At a subsequent stage, the system passes from the full-lift strategy to a multi-lift strategy (lines ML1 and ML2 in FIG. 2), after which the system passes gradually to a strategy of pure late-opening, and once this has been activated, the operation of calibration can be performed.

DETAILED DESCRIPTION OF A PREFERRED EMBODIMENT

Figure 3:
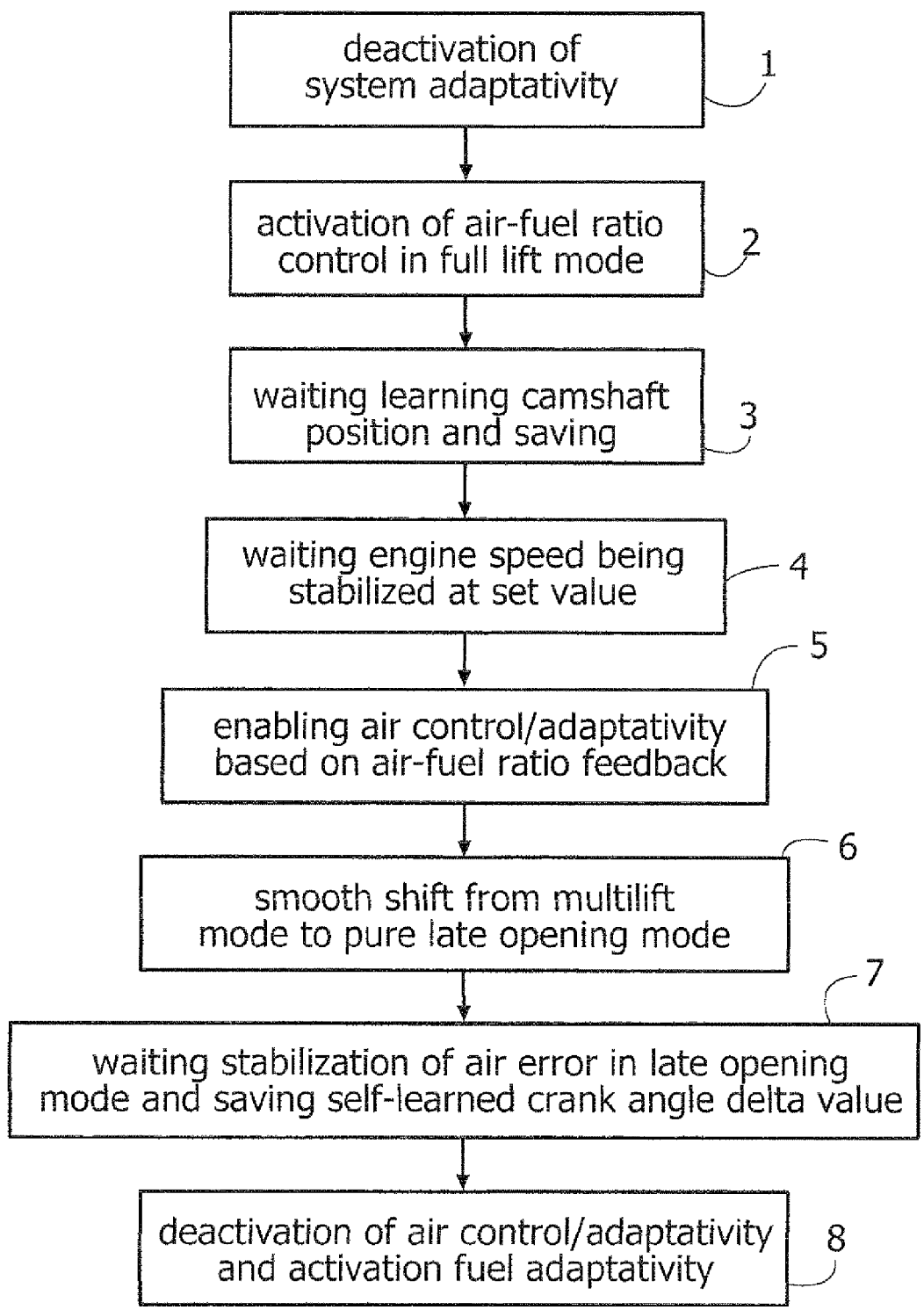

Further characteristics and advantages of the engine and of the control method according to the invention will be illustrated in detail in what follows with reference to the annexed drawings, which are provided purely by way of non-limiting example and in which:

FIG. 1, already described above, is a schematic view of a system of variable actuation of the intake valves of a petrol-fuelled engine for motor vehicles;

FIG. 2, which has also already been described above, presents diagrams that show various strategies for controlling the intake valves of the engine that can be actuated by means of the system of FIG. 1; and FIG. 3 is a block diagram that illustrates the control method forming the subject of the present invention.

As has already been amply illustrated above, the engine according to the invention is of a type equipped with a system of variable actuation of the intake valves, as illustrated in FIG. 1. Said system includes electronic control means E that are able to vary the time and/or travel of opening of the intake valves of the engine according to various possible strategies, as has already been illustrated above with reference to FIG. 2, in order to achieve a desired result.

As has also already been described above, the electronic control means E are in particular able to determine a desired diagram of the lift of the intake valve as a function of the angle of rotation of the crankshaft in order to obtain a desired value of the mass of air taken into the engine and consequently of the air-petrol ratio, once the amount of petrol injected by the injectors has been fixed.

As has also already been illustrated above, control of the value of the air-petrol ratio during operation of the engine is subject to errors due to possible variations of some parameters that affect said value within the production tolerances.

For example, in a concrete case the applicant has found that when the system of variable actuation of the intake valves operates in the late-opening mode at an engine speed of around 2000 r.p.m., with temperature of the lubricating oil used in the valve-actuation system equal to or higher than 20° C., the parameters that have an impact on the error in the estimation of the amount of air taken in are the following:

1) deviations in the angular position of the camshaft: it has been found that said deviation may correspond at the most to a variation of ±5° in the value of the crank angle and in this case determines a maximum error of ±50% in the estimated value of the mass of air taken in (10% for each degree of crank angle);

2) dispersions of the hydraulic actuators of the intake valves: they can determine at most a variation of ±1° in the value of the crank angle and in this case they determine a maximum error of ±10% in the estimation of the air taken in.

In addition, in the concrete case studied by the applicant, the control of the petrol injectors can be subject to an error of up to ±4% in the estimation of the amount of petrol injected. Finally, the lambda probe or UEGO probe can determine an error of ±1% both in the estimation of the air and in the estimation of the petrol.

From the foregoing it emerges that, in the case of the engine operating in the late-opening mode, in the control of the intake valves, the error in the estimation of the air taken in, excluding the one caused by the UEGO probe, can reach, in the worst case, ±70%, with obviously important consequences for the precision of the control of the air-petrol ratio with which the engine operates.

A fundamental aspect underlying the present invention lies in having found that the ratio between a variation in the value of the crank angle considered for actuation of the intake valves and the error in the estimation of the amount of air taken in is constant if the system operates in the late-opening mode, whatever the point of operation of the engine. In particular, as has been seen, in the case under examination the applicant has found that said ratio is such that, for each degree of variation in the value of the crank angle considered by the control system for valve actuation, an error of ±10% is determined in the estimation of the amount of air taken in.

Starting from said finding, the applicant has thus developed a modality of supervision of the functions of self-adaptive control of the air-fuel ratio of the engine that can be implemented by means of a suitable programming of the electronic control unit on board the motor vehicle and/or of the possible electronic control unit dedicated to control of the system of variable actuation of the intake valves of the engine. Said modality of supervision is implemented at least once in the life of the engine, preferably upon its first ignition, after it comes off the production line.

It should, however, be considered that, upon its first starting, the engine cannot immediately be made to function in the late-opening mode since, if the worst case mentioned above (error of 70% in the estimation of the amount of air taken in) were to arise, there would be the risk of a failure in starting of the engine. Consequently, according to the invention, the program of supervision of the functions of self-adaptive control of the air-fuel ratio implements actuation of the procedure of correction of the air error according to a predetermined criterion.

In particular, the supervisor of self-adaptive control causes the late-opening mode not to be implemented, after first starting of the engine, until there arise the conditions necessary for activation of the strategy of recovery of the air error. Said conditions are the following:

a) the electronic control means must have detected a thermal state of the UEGO probe sufficient for guaranteeing reliability of the signal issued by the probe (S in FIG. 1);

b) the engine must have reached pre-set operating conditions, for example corresponding to a temperature of the lubricating oil of the engine that is used in the system of variable actuation of the intake valves higher than a pre-set threshold value, to guarantee that the oil is not excessively viscous; in addition, the engine r.p.m. must not be higher than a predetermined threshold value (beyond a certain engine r.p.m. the late-opening mode must be excluded in so far as, otherwise, there would be the risk of a failure of the hydraulic actuators);

c) the step wherein the system for controlling the engine learns the setting angle of the camshaft must be completed.

Until the aforesaid conditions are satisfied, the system is made to operate in full-lift mode, i.e., with intake valves that open and close according to their conventional cycle (line FL in FIG. 2).

The procedure of correction of the air error envisaged according to the present invention is represented schematically in the block diagram illustrated in FIG. 3. Block 1 in said figure represents the first operation performed, which consists in deactivation of the adaptive control of the amount of petrol injected, i.e., of all the operations, envisaged according to the known art, that result from causes of errors in the estimation of the amount of petrol injected. In the next Block 2, a modality is activated for controlling the amount of air taken in, and hence the air-petrol ratio, with intake valves governed in full-lift mode. In said step, the amount of air taken in and consequently the air-petrol ratio are controlled on the basis of the signal at output from the probe S.

The next Step 3 is a step of awaiting confirmation that the system has learnt the setting angle of the camshaft and has stored it, after having detected an average value thereof. Throughout the subsequent Step 4, the engine r.p.m. is fixed at a pre-set value, preferably slightly higher than idling, after which the system verifies that the engine r.p.m. is stabilized.

In Step 5 the program of supervision of adaptive control enables start of the self-adaptive control of the air-fuel ratio on the basis of a feedback value representing the air-fuel ratio, obtained by means of the probe S, by acting on opening of the intake valves instead of on the injectors. In said step, the intake valves are governed in early-closing mode.

The next Step 6 is a step wherein the intake valves are governed in multilift mode (lines ML1 and ML2 of FIG. 2), after which there is a gradual passage from the multilift mode to a pure late-opening mode, through a progressive reduction of the first, early-closing, cycle ML1 and a progressive extension of the second, late-opening, cycle ML2, until the diagram representing the valve lift becomes, for example, the line LO2 or the line LO1.

The next Step 7 is a step for awaiting stabilization in the air error, represented by the difference between the effective value of the mass of air taken in, deducible on the basis of the signal issued by the probe S, and the theoretical value of the mass of air taken in, estimated by the control system. Once said error is stabilized, there is made to correspond thereto a value of the crank-angle delta thanks to the fact that, as has been said, in the late-opening mode the ratio between the air error and the crank-angle delta is known and constant. Consequently, in Step 7, the system learns the crank-angle delta that must be applied to the value of the crank angle, taken into account by the control system for actuation of the intake valves so that the error in the amount of air taken in is annulled, and the estimated value of the air taken in will coincide with the real value. Consequently, in Step 7, the aforesaid pre-set value of the crank-angle delta is stored in order to enable its application in the control system throughout the life of the engine.

Step 8 is a step wherein the activity of supervision of the function of adaptive control of the air is interrupted and the usual function of adaptive control of the amount of petrol injected is re-activated according to the conventional technique.

It may be envisaged that, during the life of the engine, in given operating conditions of the engine, for example at high engine r.p.m. and at low loads, and only when the system of variable actuation of the valves is in early-closing mode, a real-time control is activated on the amount of air taken in, in the case where the air error is considerable, considering both the feedback coming from the probe S and the feedback coming from a debimeter provided in the intake duct of the engine (physical or virtual debimeter—see patent No. EP07425688.4, developed by a company of the same group as that of the present applicant).

Thanks to the system and to the control method described above, the invention guarantees a greater accuracy as compared to traditional solutions in so far as it is possible to discern the causes of the error on the air-fuel ratio that have an influence only on the estimation of the amount of air (hydraulic actuator of the intake valves, setting of the camshaft) with respect to the causes that influence the estimation of the petrol injected.

The system according to the invention also guarantees a greater adaptation according to the configurations of the engine in so far as it is possible to apply the same criterion of control for any type of engine equipped with hydraulic actuators of the type described, irrespective of the architecture of the engine and the architecture of the hydraulic actuators, as well as both for aspirated engines and for supercharged engines. The system according to the invention is also applicable to gas-fuelled engines, for example ones fuelled with methane or LPG.

The invention also presents the advantage of the repeatability and the simplicity of the procedure. It is possible to repeat the learning procedure after any action that necessarily entails resetting of the parameters stored in the control system, hence not only when the vehicle comes off the production line, but also subsequent to an after-sales intervention. The system can envisage that the procedure is implemented, for example, by simply bringing the engine, with no gear engaged, to a point of operation suitable for actuation of the valves of the engine in late-opening mode (for instance, above idling conditions, in conditions of not excessively high r.p.m./load).

Finally, the invention also guarantees an economic advantage in so far as the procedure uses information coming from components that already exist in a normal-production automobile configuration, hence without any need for additional costs.

Of course, without prejudice to the principles of the invention, the details of construction and the embodiments may vary widely with respect to what has been described and illustrated herein purely by way of example, without thereby departing from the scope of the present invention.

What is claimed is:

1. An internal-combustion engine, comprising:
    at least one intake valve for each cylinder, provided with elastic means for tending to push the valve towards a closed position;
    at least one camshaft for controlling said intake valves by utilization of respective tappets; and
    an electronically controlled hydraulic system for variable actuation of the intake valves, said system including:
        a pressurized fluid chamber set between each of said respective tappets and a respective intake valve, said pressurized fluid chamber connected to an exhaust channel by way of a passage controlled by a solenoid valve so that when said solenoid valve is opened the intake valve is uncoupled from the respective tappet and is kept closed by said elastic means; and
        electronic control means for controlling each solenoid valve so as to vary the time and/or travel of opening of the respective intake valve as a function of the operating conditions of the engine;
    wherein said engine moreover comprises means for detecting the air-fuel ratio, designed to detect and/or calculate the effective value of the air-fuel ratio with which the engine is operating, to enable functions of self-adaptive control of the air-fuel ratio by means for electronic control,
    said engine being characterized in that the aforesaid electronic control means are programmed for performing, at least once in the life of the engine, an activity of supervision of the functions of self-adaptive control of the air-fuel ratio, said activity of supervision including:
        activating a late-opening actuation mode of the intake valves, wherein the intake valves are opened with a pre-set delay with respect to the conventional cycle determined by the geometry of the cam;
        in said late-opening mode, detecting the error represented by the difference between the effective value of the air-fuel ratio as detected by said means for detecting the air-fuel ratio and a theoretical value of the ratio estimated by said electronic control means; and
        storing the variation that must be applied to the value of the crank angle used by said electronic control means in controlling said actuation system in order to cause the value of the air-fuel ratio estimated by said electronic control means to coincide with the aforesaid effective value of the air-fuel ratio, on the basis of identification of a constant value of the ratio existing between a variation in the value of the crank angle and the error in the estimation of the air-fuel ratio when the system operates in late-opening mode,
    said electronic means being programmed for always applying throughout the subsequent life of the engine the aforesaid corrective value of the crank angle in controlling the system of actuation of the intake valves.

2. The engine according to claim 1, wherein said electronic control means are programmed for performing said activity of supervision at least upon first ignition of the engine after it comes off the production line.

3. The engine according to claim 1, wherein said electronic control means are programmed for activating said late-opening mode only once predetermined conditions of operation of the engine have been reached.

4. The engine according to claim 3, wherein said predetermined conditions of operation include:
    reaching of a thermal regime predetermined by a UEGO probe prearranged for issuing a signal indicating the composition of the exhaust gases of the engine, on the basis of which the effective value of the air-fuel ratio is detected;
    reaching of a predetermined threshold value of the temperature of the fluid used in said hydraulic system of actuation of the intake valves;
    engine r.p.m, lower than a predetermined threshold value; and
    occurrence of self-learning of the setting angle of the camshaft.

5. The engine according to claim 1, wherein said corrective value of the crank angle is determined on the basis of the identification of a ratio between a delta in the value of the crank angle and an error in the estimated value of the air-fuel ratio when the system of actuation of the intake valves is in the late-opening mode, said ratio being such that to a variation of one degree in the value of the crank angle there corresponds an error of 10% in the estimated value of the air-fuel ratio.

6. The engine according to claim 1, wherein said activity of supervision comprises a first step of deactivation of a system of self-adaptive control of the amount of petrol injected.

7. The engine according to claim 1, wherein said activity of supervision envisages: a first step, wherein the system of actuation of the intake valves is in full-lift mode; a second step, wherein the system is in multilift mode; and a third step, wherein the system passes gradually from said multilift mode to a pure late-opening mode, and once the latter condition has been reached, the system awaits stabilization in the value of the air error that is the difference between effective value and estimated value of the air-fuel ratio.

8. A method for controlling an internal-combustion engine according to what is specified in claim 1.

* * * * *